(12) United States Patent
Yamada et al.

(10) Patent No.: US 7,940,318 B2
(45) Date of Patent: May 10, 2011

(54) SOLID-STATE IMAGING DEVICE AND DRIVING METHOD FOR A SOLID-STATE IMAGING DEVICE FOR HIGH-SPEED PHOTOGRAPHY AND ENABLING MULTIPLE EXPOSURE PHOTOGRAPHY

(75) Inventors: Takayoshi Yamada, Osaka (JP); Takumi Yamaguchi, Kyoto (JP); Takahiko Murata, Osaka (JP); Shigetaka Kasuga, Osaka (JP)

(73) Assignee: Panasonic Corporation, Osaka (JP)

( * ) Notice: Subject to any disclaimer, the term of this patent is extended or adjusted under 35 U.S.C. 154(b) by 757 days.

(21) Appl. No.: 11/889,202

(22) Filed: Aug. 9, 2007

(65) Prior Publication Data
US 2008/0036889 A1 Feb. 14, 2008

(30) Foreign Application Priority Data
Aug. 10, 2006 (JP) .................. 2006-218256

(51) Int. Cl.
*H04N 3/14* (2006.01)
(52) U.S. Cl. ..................... 348/308; 348/302
(58) Field of Classification Search .............. 348/294, 348/300–302, 308
See application file for complete search history.

(56) References Cited

U.S. PATENT DOCUMENTS

| 6,040,568 | A  | * | 3/2000  | Caulfield et al. | 250/208.1 |
| 6,850,278 | B1 | * | 2/2005  | Sakurai et al.   | 348/302   |
| 6,972,795 | B1 |   | 12/2005 | Etoh et al.      |           |
| 7,382,407 | B2 | * | 6/2008  | Cho et al.       | 348/296   |
| 2003/0076431 | A1 | * | 4/2003 | Krymski       | 348/308   |
| 2005/0018065 | A1 | * | 1/2005 | Tashiro et al. | 348/308  |
| 2005/0270394 | A1 | * | 12/2005 | Dierickx et al. | 348/308 |
| 2006/0050163 | A1 | * | 3/2006 | Wang et al.    | 348/308  |
| 2006/0132634 | A1 | * | 6/2006 | Kudoh          | 348/308  |

FOREIGN PATENT DOCUMENTS
JP    2000-165750    6/2000
* cited by examiner

*Primary Examiner* — Timothy J Henn
(74) *Attorney, Agent, or Firm* — McDermott Will & Emery LLP

(57) ABSTRACT

A solid-state imaging device that enables more images to be photographed and a reading time to be shortened by effectively using storage cells is provided. By combining pieces of information which correspond to signal charges output from a photoelectric converter and are sequentially stored in storage cells, it is possible to store more pieces of information than the number of storage cells. Also, by reading the combined information stored in one storage cell, it is possible to read more pieces of information by a single reading operation.

15 Claims, 12 Drawing Sheets

FIG.8A

| M1 | V1 |
| M2 | V2 |
| M3 | V3 |
| M4 | V4 |
| M5 | |
| M6 | |
| M7 | |
| M8 | |

FIG.8B

| M1 | (V1+V2+V3+V4)/4 |
| M2 | (V1+V2+V3+V4)/4 |
| M3 | (V1+V2+V3+V4)/4 |
| M4 | (V1+V2+V3+V4)/4 |
| M5 | |
| M6 | |
| M7 | |
| M8 | |

FIG.8C

| M1 | (V1+V2+V3+V4)/4 |
| M2 | V5 |
| M3 | V6 |
| M4 | V7 |
| M5 | V8 |
| M6 | |
| M7 | |
| M8 | |

FIG.8D

| M1 | (V1+V2+V3+V4)/4 |
| M2 | (V5+V6+V7+V8)/4 |
| M3 | (V9+V10+V11+V12)/4 |
| M4 | (V13+V14+V15+V16)/4 |
| M5 | V17 |
| M6 | V18 |
| M7 | V19 |
| M8 | V20 |

FIG.8E

| M1 | (V1+V2+V3+V4)/4 |
| M2 | (V5+V6+V7+V8)/4 |
| M3 | (V9+V10+V11+V12)/4 |
| M4 | (V13+V14+V15+V16)/4 |
| M5 | (V17+V18+V19+V20)/4 |
| M6 | (V17+V18+V19+V20)/4 |
| M7 | (V17+V18+V19+V20)/4 |
| M8 | (V17+V18+V19+V20)/4 |

$K \times \{m-(K-1)\}$

$K \times \{m-(K-1)\}$

$K \times K \times \{m-(K-1)-(K-1)\}$

$K \times K \times K \times \{m-(K-1)-(K-1)-(K-1)\}$

SOLID-STATE IMAGING DEVICE AND DRIVING METHOD FOR A SOLID-STATE IMAGING DEVICE FOR HIGH-SPEED PHOTOGRAPHY AND ENABLING MULTIPLE EXPOSURE PHOTOGRAPHY

BACKGROUND OF THE INVENTION

1. Field of the Invention

The present invention relates to a solid-state imaging device in which photoelectric converters are arranged in a two-dimensional matrix, and to a technique of providing a function for significantly increasing the number of images taken in high-speed photography and enabling multiple exposure photography.

2. Related Art

High-speed cameras are used in detail analyses such as a car crash test and a product drop test. Especially in recent years, high-speed cameras are also used in analyses of phenomena in physical chemistry such as a combustion state in an internal combustion engine and a chemical reaction.

Also, with the advancement of digital image processing systems, the use of high-speed digital cameras that adopt solid-state imaging devices such as a CCD (Charge Coupled Device) and a MOS image sensor becomes increasingly predominant. In such systems, there is no need to develop a film after photographing unlike conventional film cameras, and a photographed image can be checked instantly. In addition, the image can be easily provided into a digital image analyzing device using a personal computer and the like.

Since the photographed image can be checked instantly, even when a photographing error occurs, it can be easily dealt with by, for example, reshooting on the spot. For processes such as data reuse and data processing, too, high-speed digital cameras that lend themselves to use for image processing and image alteration on personal computers are suitable.

However, in such high-speed cameras, the number of frames that can be photographed successively is limited due to a factor such as a speed of writing onto a recording medium. To continuously photograph a moving image, it is necessary to confine a frame rate and an image size to such ranges that can be kept up with by the recording medium writing speed. When performing high-speed photography with a high resolution, since the number of photographable frames is limited and also a shooting interval is short, a photographing period will end up being very short. For example, when the frame rate is 10,000 frames per second and the number of photographable frames is 100, the photographing period is only 10 milliseconds.

Even when a solid-state imaging device that has storage cells in a pixel is employed, reading data takes a long time, because the number of storage cells is limited and also the same number of reading operations as the storage cells need to be performed to read data from these storage cells. Accordingly, in the case where high-speed photography is performed the same number of times as the storage cells and, after reading data from the storage cells, high-speed photography is again performed the same number of times as the storage cells, a photographing operation is stopped during when the data is being read, so that only information which is discrete in time can be obtained.

A device that achieves high-speed photography by storing information output from a solid-state imaging device into storage cells is conventionally available as disclosed in Japanese patent application publication No. 2000-165750. However, the number of storage cells is limited to about several tens to several hundreds, and it is impossible to store a larger number of pieces of information than the number of storage cells. Also, reading data requires a time period corresponding to the number of storage cells.

For multiple exposure photography that combines images of a fast moving object at discrete times into a single image, a conventional film camera requires an external device such as a strobe light capable of emitting pulses of light successively at high speed. Though the use of an electronic shutter of a CCD or the like enables discrete images to be obtained, high-speed photography is difficult. Even when a solid-state imaging device is used, an external device such as a high-speed mechanical shutter and a high-speed multi strobe light is necessary. Thus, high-speed multiple exposure photography by a camera alone has not been realized yet.

SUMMARY OF THE INVENTION

To achieve the stated aim, one aspect of the present invention is a solid-state imaging device including: a photoelectric converter corresponding to a pixel and operable to output a signal charge in accordance with received light; j storage cells corresponding to the pixel and operable to respectively store therein pieces of information corresponding to signal charges that are output from the photoelectric converter at different time points, where $j \geq 2$; a combining unit operable to combine pieces of information stored in at least two storage cells of the j storage cells, to generate combined information; and a selective storing unit operable to store the combined information into one of the j storage cells.

According to this aspect, more pieces of information than the number of storage cells can be stored at the same time. For example, when photographing a phenomenon with a high-speed camera that includes storage cells, it is possible to take a larger number of photographs than the storage cells. Also, since pieces of information stored in storage cells are output in a combined state, a lot of information can be read by a single reading operation.

To achieve the stated aim, one aspect of the present invention is the solid-state imaging device, wherein $j \geq 3$, the at least two storage cells are f storage cells, where $2 \leq f \leq j-1$, and the storage cell in which the combined information is stored is other than the f storage cells.

According to this aspect, more pieces of information than the storage cells can be stored. Also, a storage cell that stores information from the photoelectric converter and a storage cell that stores combined information can be managed separately.

To achieve the stated aim, one aspect of the present invention is the solid-state imaging device, wherein the storage cell in which the combined information is stored is one of the at least two storage cells.

According to this aspect, when combining, for example, three pieces of information, these pieces of information can be averaged by connecting three capacities storing the pieces of information in parallel. In this case, combined information of the three pieces of information is stored in each of the three capacities. By maintaining the combined information in one of the storage cells while storing new pieces of information into the remaining storage cells, the storage cells can be used effectively. Furthermore, the combining operation can be conducted while suppressing a signal degradation.

To achieve the stated aim, one aspect of the present invention is the solid-state imaging device further including: a writing unit operable to, in parallel with the combining by the combining unit, write a piece of information corresponding to a signal charge output from the photoelectric converter, into a storage cell other than the at least two storage cells.

According to this aspect, an operation of storing a piece of information from the photoelectric converter into a storage cell and an operation of combining pieces of information stored in other storage cells are performed simultaneously. This allows for high-speed photography.

To achieve the stated aim, one aspect of the present invention is the solid-state imaging device further including: a signal amplifier operable to amplify a signal charge output from the photoelectric converter before the storing by a storage cell.

According to this aspect, a piece of information output from the photoelectric converter is stored in a storage cell in an amplified state. This reduces a decrease in image quality caused by noise.

To achieve the stated aim, one aspect of the present invention is the solid-state imaging device, wherein the photoelectric converter is connected to the j storage cells by one shared signal line, and the solid-state imaging device further includes: an initializing unit operable to partly or entirely initialize a signal charge of the shared signal line.

According to this aspect, pieces of information stored in storage cells are combined and read without adding information remaining on the shared signal line. Hence a decrease in image quality can be suppressed.

To achieve the stated aim, one aspect of the present invention is the solid-state imaging device further including: a noise cancelling circuit operable to remove noise specific to the pixel.

According to this aspect, fixed pattern noise caused by a variation in pixel property is removed from a piece of information output from the photoelectric converter, with it being possible to suppress a decrease in image quality.

To achieve the stated aim, one aspect of the present invention is the solid-state imaging device, wherein the noise cancelling circuit removes the noise before the storing by a storage cell.

According to this aspect, fixed pattern noise caused by a variation in pixel property is removed from a piece of information output from the photoelectric converter, with it being possible to suppress a decrease in image quality.

To achieve the stated aim, one aspect of the present invention is a driving method for a solid-state imaging device that includes: a photoelectric converter corresponding to a pixel and operable to output a signal charge in accordance with received light; and n storage cells corresponding to the pixel and operable to respectively store pieces of information corresponding to signal charges output from the photoelectric converter, the driving method including: a first storing step of storing pieces of information corresponding to signal charges that are output from the photoelectric converter at different time points $t(1), t(2), \ldots, t(n)$, respectively into the n storage cells; a combining step of combining pieces of information stored in at least two storage cells of the n storage cells to generate combined information, and storing the combined information into one storage cell; and a second storing step of storing a piece of information corresponding to a signal charge that is output from the photoelectric converter at a time point $t(n+1)$, into a storage cell other than the storage cell in which the combined information is stored.

According to this aspect, more pieces of information than the number of storage cells can be stored at the same time.

To achieve the stated aim, one aspect of the present invention is the driving method, wherein an interval between adjacent time points of $t(1), t(2), \ldots, t(n), t(n+1)$ is fixed.

According to this aspect, pieces of information are combined while maintaining a fixed shooting interval, with it being possible to store more pieces of information than the number of storage cells with the fixed interval.

To achieve the stated aim, one aspect of the present invention is the driving method, wherein the photoelectric converter outputs a signal charge corresponding to an intensity of light received in each time frame of a same length that includes a different one of the time points $t(1), t(2), \ldots, t(n), t(n+1)$.

According to this aspect, pieces of information are combined while maintaining a fixed exposure time, with it being possible to store more pieces of information than the number of storage cells in the fixed exposure time.

To achieve the stated aim, one aspect of the present invention is the driving method, wherein the second storing step stores pieces of information corresponding to signal charges that are output from the photoelectric converter at time points $t(n+1)$ to $t(n+m)$, respectively into m storage cells other than the storage cell in which the combined information is stored, and the combining and storing by the combining step end before the storing by the second storing step ends.

According to this aspect, more pieces of information than the number of storage cells can be stored at the same time.

To achieve the stated aim, one aspect of the present invention is the driving method, wherein an interval between adjacent time points of $t(1), t(2), \ldots, t(n), t(n+1), \ldots, t(n+m)$ is fixed.

According to this aspect, pieces of information are combined while maintaining a fixed shooting interval, with it being possible to store more pieces of information than the number of storage cells with the fixed interval.

To achieve the stated aim, one aspect of the present invention is the driving method, wherein m=n.

According to this aspect, pieces of information are combined while maintaining a fixed shooting interval, with it being possible to store more pieces of information than the number of storage cells with the fixed interval.

To achieve the stated aim, one aspect of the present invention is a driving method for a solid-state imaging device that includes: a photoelectric converter corresponding to a pixel and operable to output a signal charge in accordance with received light; and a storage cells corresponding to the pixel and operable to respectively store pieces of information corresponding to signal charges output from the photoelectric converter, the driving method including: a first step of storing first combined information obtained by combining pieces of information stored in b storage cells, into one of the b storage cells, where b<a; and a second step of storing second combined information obtained by combining pieces of information stored in c storage cells other than the storage cell in which the first combined information is stored, into one of the c storage cells, where c<a.

According to this aspect, more pieces of information than the number of storage cells can be stored at the same time.

To achieve the stated aim, one aspect of the present invention is a driving method for a solid-state imaging device that includes: a photoelectric converter corresponding to a pixel and operable to output a signal charge in accordance with received light; and a storage cells corresponding to the pixel and operable to respectively store pieces of information corresponding to signal charges output from the photoelectric converter, the driving method including: a first step of storing first combined information obtained by combining pieces of information stored in b storage cells, into one of the b storage cells, where b<a; and a second step of storing second combined information obtained by combining pieces of information stored in c storage cells other than the storage cell in which the first combined information is stored, into a storage cell other than the c storage cells, where c<a.

According to this aspect, more pieces of information than the number of storage cells can be stored at the same time.

To achieve the stated aim, one aspect of the present invention is a driving method for a solid-state imaging device that includes: a photoelectric converter corresponding to a pixel and operable to output a signal charge in accordance with received light; and a storage cells corresponding to the pixel and operable to respectively store pieces of information corresponding to signal charges output from the photoelectric converter, the driving method including: a first step of storing first combined information obtained by combining pieces of information stored in b storage cells, into a storage cell other than the b storage cells, where b<a; and a second step of storing second combined information obtained by combining pieces of information stored in c storage cells other than the storage cell in which the first combined information is stored, into one of the c storage cells, where c<a.

According to this aspect, more pieces of information than the number of storage cells can be stored at the same time.

To achieve the stated aim, one aspect of the present invention is a driving method for a solid-state imaging device that includes: a photoelectric converter corresponding to a pixel and operable to output a signal charge in accordance with received light; and a storage cells corresponding to the pixel and operable to respectively store pieces of information corresponding to signal charges output from the photoelectric converter, the driving method including: a first step of storing first combined information obtained by combining pieces of information stored in b storage cells, into a storage cell other than the b storage cells, where b<a; and a second step of storing second combined information obtained by combining pieces of information stored in c storage cells other than the storage cell in which the first combined information is stored, into a storage cell other than the c storage cells, where c<a.

According to this aspect, more pieces of information than the number of storage cells can be stored at the same time.

To achieve the stated aim, one aspect of the present invention is the driving method, wherein b=c.

According to this aspect, more pieces of information than the number of storage cells can be stored at the same time. Also, the combining operation is repeated for the same number of pieces of information, with it being possible to simplify a control device.

To achieve the stated aim, one aspect of the present invention is the driving method, further including: a reading step of reading signal charges output from the photoelectric converter at a plurality of time points, by a single operation of reading from the storage cell in which the first combined information or the second combined information is stored.

According to this aspect, stored pieces of information are read at once, so that reading can be performed in a short time.

To achieve the stated aim, one aspect of the present invention is a solid-state imaging device including: a photoelectric converter corresponding to a pixel and operable to output a signal charge in accordance with received light; a plurality of storage cells corresponding to the pixel and operable to respectively store pieces of information corresponding to signal charges that are output from the photoelectric converter; and a combining unit operable to combine pieces of information stored in at least two storage cells of the plurality of storage cells to generate combined information, and output the combined information.

According to this aspect, stored pieces of information are read at once, so that reading can be performed in a short time.

To achieve the stated aim, one aspect of the present invention is the driving method, wherein the first step, after storing the first combined information into the one of the b storage cells, combines pieces of information stored in b storage cells other than the storage cell in which the first combined information is stored to generate third combined information, and stores the third combined information into the c storage cells.

To achieve the stated aim, one aspect of the present invention is the driving method, wherein in the first step, the b storage cells are storage cells $m(1), m(2), \ldots, m(b)$ in which pieces of information corresponding to signal charges that are output from the photoelectric converter at time points $t(1), t(2), \ldots, t(b)$ are stored respectively, and the one of the b storage cells is the storage cell $m(1)$, and in the second step, the c storage cells are storage cells $m(2), m(3), \ldots, m(c+1)$ in which pieces of information corresponding to signal charges that are output from the photoelectric converter at time points $t(b+1), t(b+2), \ldots, t(b+c)$ are stored respectively, and the one of the c storage cells is the storage cell $m(2)$.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 8 shows an example of information stored in storage cells in the solid-state imaging device according to the embodiment of the present invention;

FIG. 9 shows an example of information stored in the storage cells in the solid-state imaging device according to another embodiment of the present invention;

DESCRIPTION OF THE PREFERRED EMBODIMENT(S)

The following describes embodiments of the present invention with reference to FIGS. 1 to 12.

First Embodiment

Figure 1:
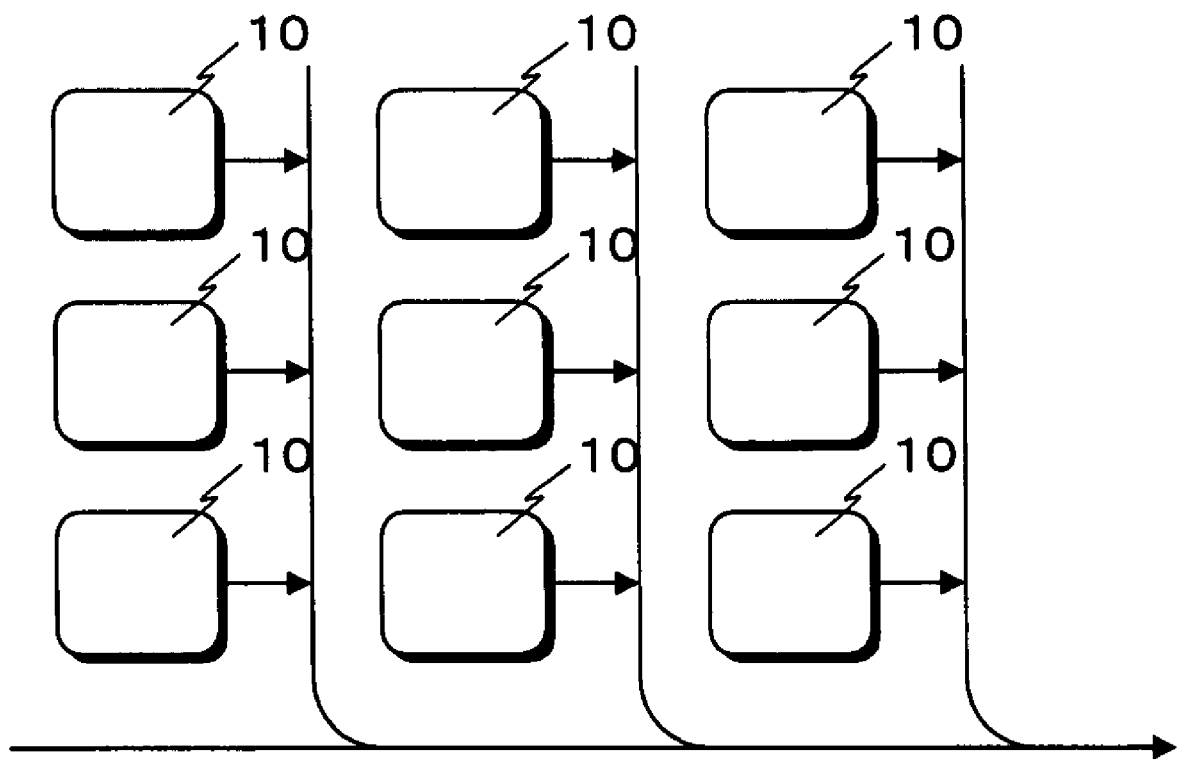
FIG. 1 shows an example construction of a solid-state imaging device.
Figure 2:
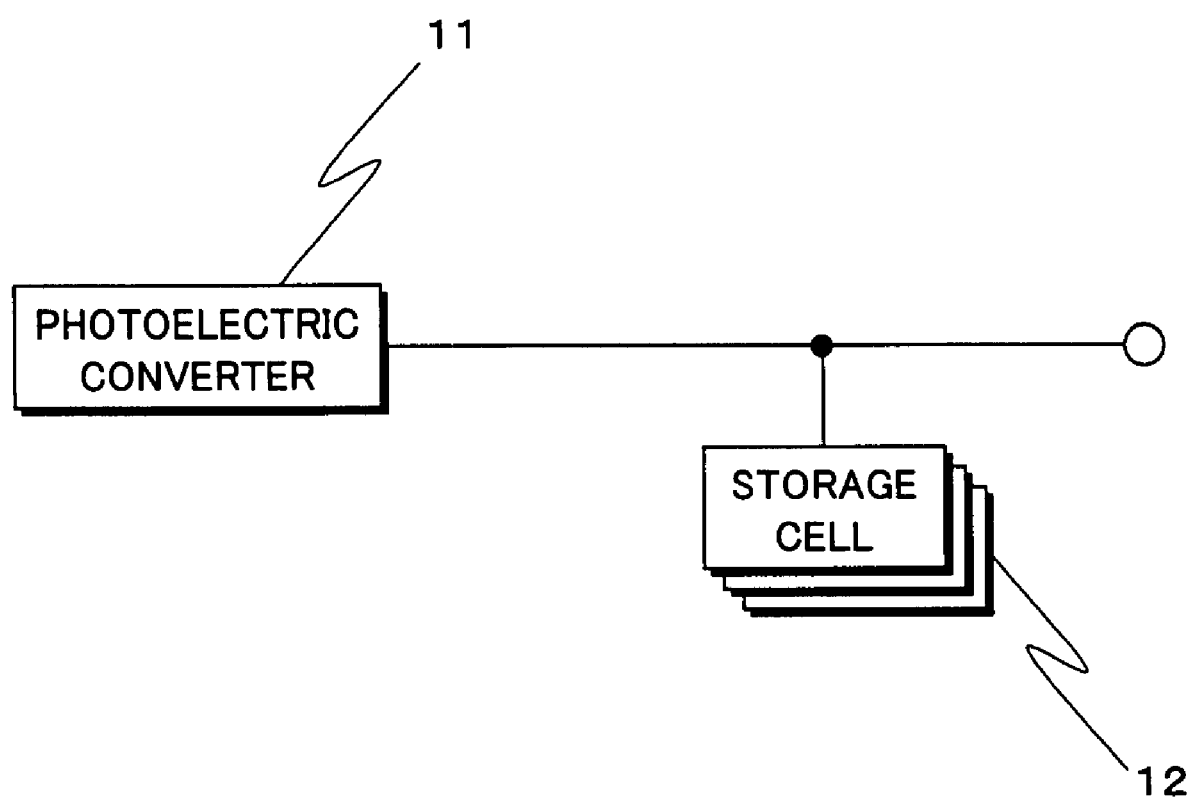
FIG. 2 shows an example construction of a solid-state imaging device according to an embodiment of the present invention.

FIG. 1 shows a solid-state imaging device in which photoelectric converters are arranged in a matrix. In FIG. 1, reference numeral 10 denotes a pixel that includes a photoelectric converter. FIG. 2 shows a first example of a solid-state imaging device according to the present invention. In FIG. 2, reference numeral 11 denotes a photoelectric converter for converting a light signal to an electric signal, and reference numeral 12 denotes a plurality of storage cells each for storing a piece of information from the photoelectric converter 11.

The solid-state imaging device according to the present invention selects, for a signal from one of the photoelectric converters 11 arranged in a matrix as shown in FIG. 1, one of the plurality of storage cells 12 provided in a corresponding pixel, and stores the signal in the selected storage cell 12. The solid-state imaging device then selects at least two storage cells 12 from storage cells 12 that each store a piece of information corresponding to a signal charge, and combines pieces of information stored in the selected storage cells 12.

Figure 3:
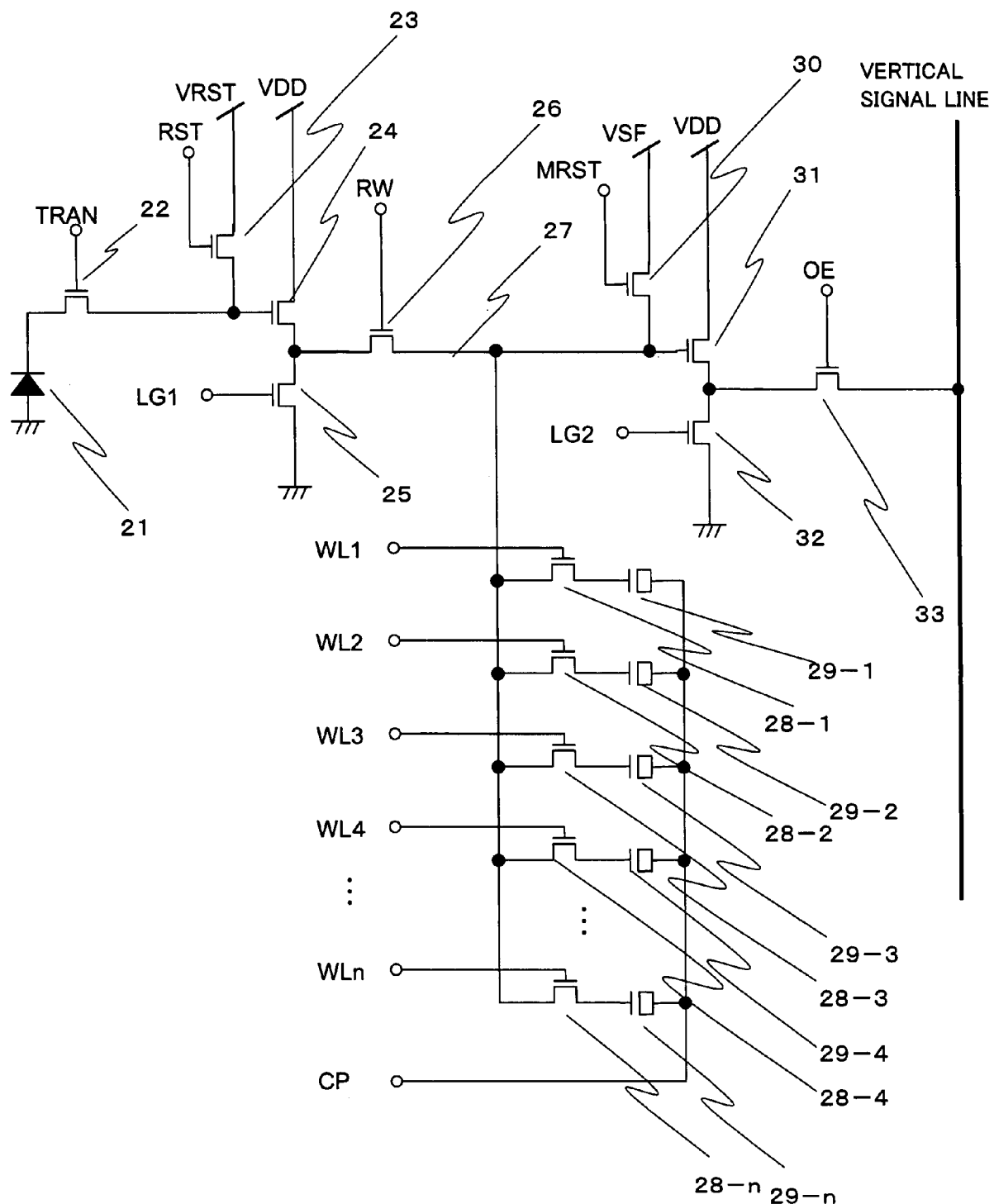
FIG. 3 shows an example of a circuit of the solid-state imaging device according to the embodiment of the present invention.

FIG. 3 shows an example of a circuit of this solid-state imaging device. In FIG. 3, reference numeral 21 denotes a photoelectric converter, reference numeral 22 denotes a transfer MOS transistor for transferring a signal from the photoelectric converter 21, and reference numeral 23 denotes a reset MOS transistor for outputting a pixel noise signal.

A gate of the transfer MOS transistor 22 is connected to signal line TRAN, and a gate of the reset MOS transistor 23 is connected to signal line RST.

A source of the reset MOS transistor 23 is connected to a drain of the transfer MOS transistor 22, and a drain of the reset MOS transistor 23 is set to desired voltage VRST.

An output of the photoelectric converter 21 is connected to a source of the transfer MOS transistor 22, and the drain of the transfer MOS transistor 22 is connected to a gate of a MOS transistor 24.

The MOS transistor 24 and a MOS transistor 25 form a source follower. A drain of the MOS transistor 24 is connected to power supply VDD, and a source of the MOS transistor 24 is connected to a drain of the MOS transistor 25. Bias voltage LG1 is applied to a gate of the MOS transistor 25.

A connecting point between the source of the MOS transistor 24 and the drain of the MOS transistor 25 is an output node, which is connected to a source of a MOS transistor 26. A gate of the MOS transistor 26 is connected to signal line RW, and a drain of the MOS transistor 26 is connected to a shared signal line 27. The shared signal line 27 is connected to sources of storage cell selection MOS transistors 28-1, 28-2, ..., 28-n.

Gates of the storage cell selection MOS transistors 28-1, 28-2, ..., 28-n are respectively connected to signal lines WL1, WL2, ..., WLn. Drains of the storage cell selection MOS transistors 28-1, 28-2, ..., 28-n are respectively connected to storage cells 29-1, 29-2, ..., 29-n, with other terminals of the storage cells 29-1, 29-2, ..., 29-n being connected to signal line CP.

The shared signal line 27 is connected to a source of an initializing MOS transistor 30 for initializing the shared signal line 27.

A drain of the initializing MOS transistor 30 is set to desired voltage VSF, and a gate of the initializing MOS transistor 30 is connected to signal line MRST.

The shared signal line 27 is also connected to a gate of a MOS transistor 31. The MOS transistor 31 and a MOS transistor 32 form a source follower. A drain of the MOS transistor 31 is connected to power supply VDD, and a source of the MOS transistor 31 is connected to a drain of the MOS transistor 32.

Bias voltage LG2 is applied to a gate of the MOS transistor 32. A connecting point between the source of the MOS transistor 31 and the drain of the MOS transistor 32 is an output node, which is connected to a source of an output selection MOS transistor 33.

A gate of the output selection MOS transistor 33 is connected to signal line OE, and a drain of the output selection MOS transistor 33 is connected to a vertical signal line.

Figure 4:
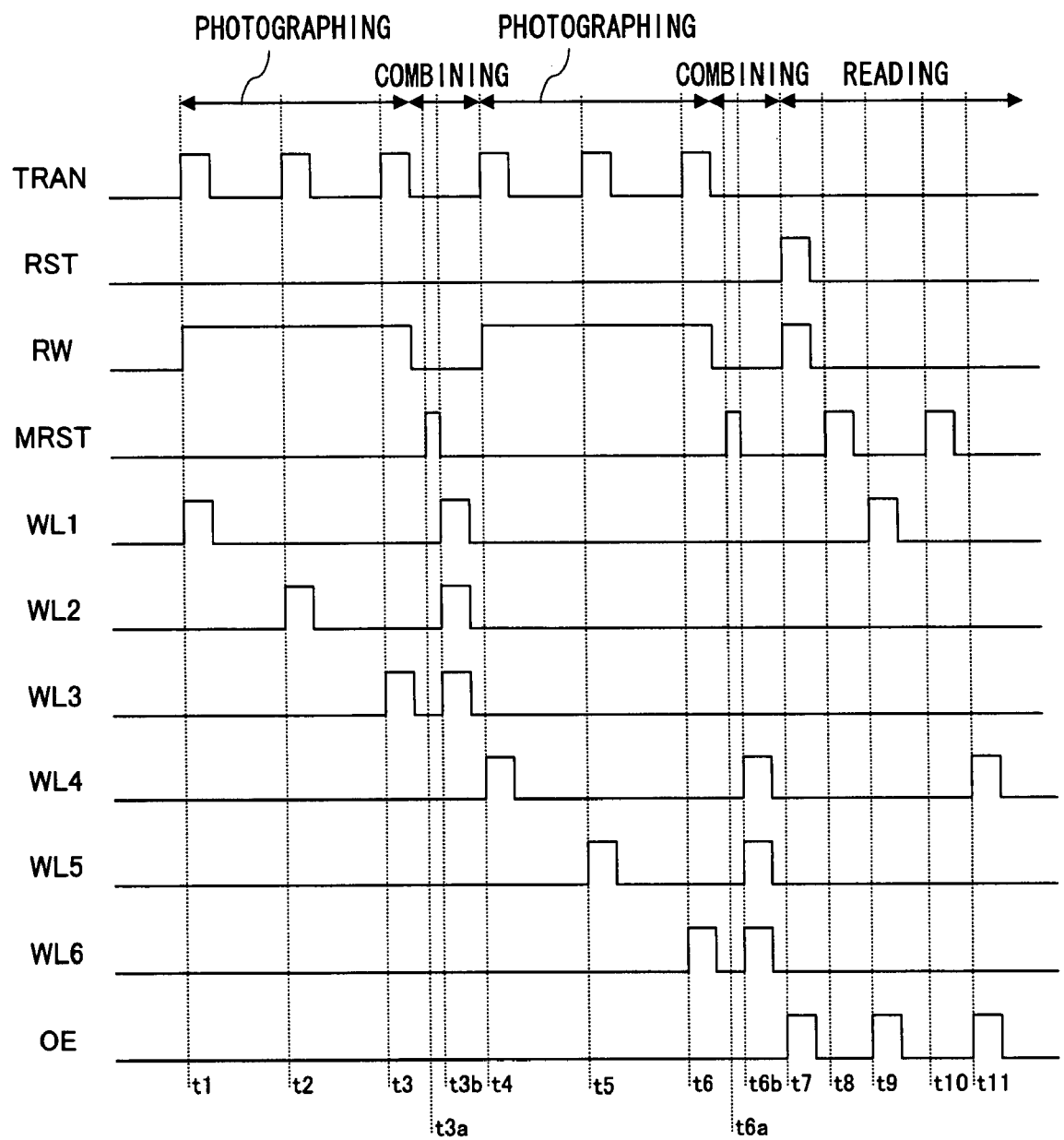
FIG. 4 shows driving pulses of the solid-state imaging device according to the embodiment of the present invention.

FIG. 4 shows an example of driving pulse waveforms of the circuit shown in FIG. 3. In FIG. 4, TRAN denotes a driving waveform of the signal line connected to the gate of the transfer MOS transistor 22. RST denotes a driving waveform of the signal line connected to the gate of the reset MOS transistor 23. RW denotes a driving waveform of the signal line connected to the gate of the MOS transistor 26. MRST denotes a driving waveform of the signal line connected to the gate of the initializing MOS transistor 30.

WL1 to WL6 denote driving waveforms of the signal lines connected to the gates of the storage cell selection MOS transistors 28-1 to 28-n. OE denotes a driving waveform of the signal line connected to the gate of the output selection MOS transistor 33.

In the solid-state imaging device according to the present invention, a signal from the photoelectric converter 21 is stored into the group of storage cells 28-1 to 28-n, and then pieces of information stored in these storage cells are combined and read.

An operation example is described below, with reference to FIGS. 3 and 4.

At time t1, a HIGH pulse is applied to signal line RW and signal line TRAN, and signal line WL1 for selecting the first storage cell 29-1 is driven HIGH, to turn on the storage cell selection MOS transistor 28-1 and transfer a piece of information from the photoelectric converter 21 to the first storage cell 29-1.

Likewise, at time t2, signal line WL2 for selecting the second storage cell 29-2 is driven HIGH, to turn on the storage cell selection MOS transistor 28-2 and transfer a piece of information from the photoelectric converter 21 to the second storage cell 29-2.

At time t3, signal line WL3 for selecting the third storage cell 29-3 is driven HIGH, to turn on the storage cell selection MOS transistor 28-3 and transfer a piece of information from the photoelectric converter 21 to the third storage cell 29-3.

Next, at time t3a, a HIGH pulse is applied to signal line MRST, to initialize the shared signal line 27 that connects the photoelectric converter 21 and the storage cells 29 by desired voltage VSF.

At time t3b that follows, the storage cell selection MOS transistors 28-1, 28-2, and 28-3 corresponding to the first storage cell 29-1, the second storage cell 29-2, and the third storage cell 29-3 are simultaneously turned on. As a result, the first storage cell 29-1, the second storage cell 29-2, and the third storage cell 29-3 are connected in parallel, and the charges accumulated in these storage cells are averaged.

At this time, signal line RW remains LOW. Accordingly, a combined signal is stored in the first storage cell 29-1, the second storage cell 29-2, and the third storage cell 29-3.

In the same manner, pieces of information are stored into the remaining storage cells at time t4 to time t6 and then these pieces of information are combined.

After this, at time t7, a HIGH pulse is applied to signal line RST, signal line RW, and signal line OE, to output a pixel noise signal. At time t8, a HIGH pulse is applied to signal line MRST. At time t9, signal line OE is driven HIGH and the storage cell selection MOS transistor 28-1 corresponding to the first storage cell 29-1 is turned on, as a result of which the combined information stored in the first storage cell 29-1 is output.

Following this, at time t10, a HIGH pulse is applied to signal line MRST. At time t11, signal line OE is driven HIGH and the storage cell selection MOS transistor 28-4 corresponding to the fourth storage cell 29-4 is turned on, as a result of which the combined information stored in the fourth storage cell 29-4 is output. Here, noise specific to the pixel can be removed by taking a difference between the pixel noise signal previously output at time t7 and each of the signals output at time t9 and time t11.

When the storage cell selection MOS transistors 28-1, 28-2, and 28-3 corresponding to the first storage cell 29-1, the second storage cell 29-2, and the third storage cell 29-3 are simultaneously turned on at time t3*b*, a state where capacities of these storage cells are connected in parallel is created. As a result, the charges accumulated in the three capacities are averaged by these capacities.

Here, to prevent a floating capacitance of the shared signal line 27 from being combined too, the shared signal line 27 is initialized by fixed voltage VSF before the combining operation. In this way, noise can be reduced.

Figure 5:
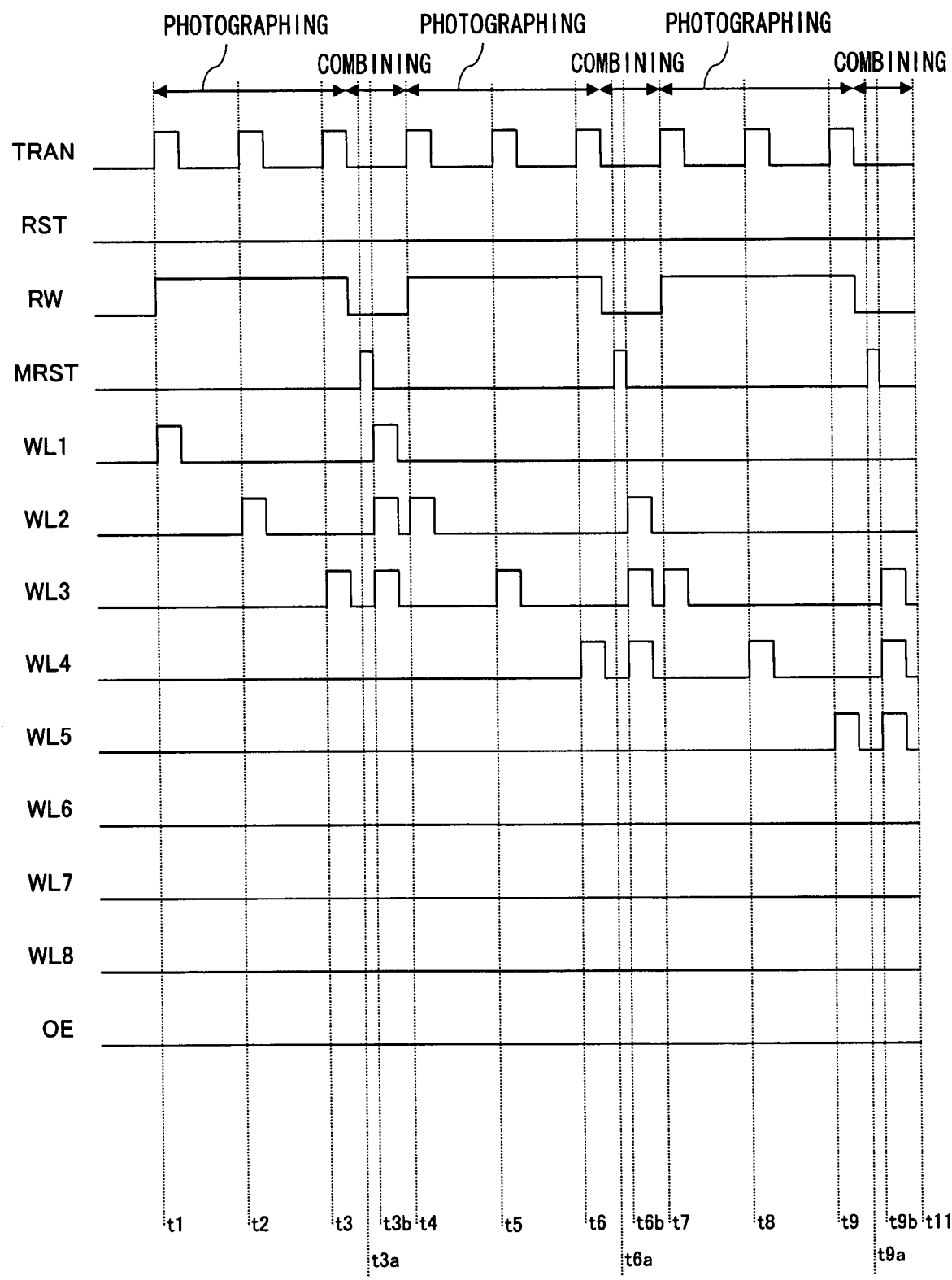
FIG. 5 shows driving pulses of the solid-state imaging device according to the embodiment of the present invention.

FIG. 5 shows an example of driving pulse waveforms in the case where, after combining pieces of information stored in storage cells, the combined information is left in only one of the storage cells and pieces of information at different time points are newly stored to the other storage cells.

In FIG. 5, TRAN denotes a driving waveform of the signal line connected to the gate of the transfer MOS transistor 22 in FIG. 3. RST denotes a driving waveform of the signal line connected to the gate of the reset MOS transistor 23 in FIG. 3. RW denotes a driving waveform of the signal line connected to the gate of the MOS transistor 26 in FIG. 3. MRST denotes a driving waveform of the signal line connected to the gate of the initializing MOS transistor 30 in FIG. 3.

WL1 to WL8 denote driving waveforms of the signal lines connected to the gates of the storage cell selection MOS transistors 28-1 to 28-*n* in FIG. 3.

At time t1, a HIGH pulse is applied to signal line RW and signal line TRAN, and signal line WL1 for selecting the first storage cell 29-1 is driven HIGH, to turn on the storage cell selection MOS transistor 28-1 and transfer a piece of information from the photoelectric converter 21 to the first storage cell 29-1.

Likewise, at time t2, signal line WL2 for selecting the second storage cell 29-2 is driven HIGH, to turn on the storage cell selection MOS transistor 28-2 and transfer a piece of information from the photoelectric converter 21 to the second storage cell 29-2.

At time t3, signal line WL3 for selecting the third storage cell 29-3 is driven HIGH, to turn on the storage cell selection MOS transistor 28-3 and transfer a piece of information from the photoelectric converter 21 to the third storage cell 29-3.

Next, at time t3*a*, a HIGH pulse is applied to signal line MRST, to initialize the shared signal line 27 that connects the photoelectric converter 21 and the storage cells 29 by the desired voltage VSF.

At time t3*b* that follows, the storage cell selection MOS transistors 28-1, 28-2, and 28-3 of the first storage cell 29-1, the second storage cell 29-2, and the third storage cell 29-3 are simultaneously turned on. As a result, the first storage cell 29-1, the second storage cell 29-2, and the third storage cell 29-3 are connected in parallel, and charges accumulated in these storage cells are averaged.

At this time, signal line RW remains LOW. Accordingly, a combined signal is stored in the first storage cell 29-1, the second storage cell 29-2, and the third storage cell 29-3.

Following this, at time t4, a HIGH pulse is applied to signal line RW and signal line TRAN, and signal line WL2 for selecting the second storage cell 29-2 is driven HIGH, to turn on the storage cell selection MOS transistor 28-2 and transfer a piece of information from the photoelectric converter 21 to the second storage cell 29-2.

At time t5, signal line WL3 for selecting the third storage cell 29-3 is driven HIGH, to turn on the storage cell selection MOS transistor 28-3 and transfer a piece of information from the photoelectric converter 21 to the third storage cell 29-3.

At time t6, signal line WL4 for selecting the fourth storage cell 29-4 is driven HIGH, to turn on the storage cell selection MOS transistor 28-4 and transfer a piece of information from the photoelectric converter 21 to the fourth storage cell 29-4.

At time t6*a*, a HIGH pulse is applied to signal line MRST, to initialize the shared signal line 27 that connects the photoelectric converter 21 and the storage cells 29 by desired voltage VSF, in the same manner as above.

At time t6*b* that follows, the storage cell selection MOS transistors 28-2, 28-3, and 28-4 corresponding to the second storage cell 29-2, the third storage cell 29-3, and the fourth storage cell 29-4 are simultaneously turned on. As a result, the second storage cell 29-2, the third storage cell 29-3, and the fourth storage cell 29-4 are connected in parallel, and charges accumulated in these storage cells are averaged. At this time, signal line RW remains LOW. Hence a combined signal is stored in the second storage cell 29-2, the third storage cell 29-3, and the fourth storage cell 29-4.

By repeating this operation on the third to fifth storage cells from time t7 to time t11, pieces of information at more time points than the number of storage cells can be stored.

Here, the combined information of the first storage cell 29-1, the second storage cell 29-2, and the third storage cell 29-3 may be stored in the fourth storage cell 29-4. In this case, however, information degradation is caused by combining pieces of information which are stored in three storage cells, by using four storage cells.

Though the example of combining pieces of information stored in three storage cells is described above, it is also possible to combine pieces of information stored in two storage cells, or more than three storage cells.

Also, by completing the operation of combining pieces of information stored in storage cells within an interval of storing a piece of information from the photoelectric converter 21 into a storage cell, the operation of storing a piece of information from the photoelectric converter into a storage cell can be continuously performed with a fixed interval.

Here, it is desirable to fix a time frame (period) for accumulating a charge corresponding to light by the photoelectric converter. This enables successive images of a fixed exposure time to be obtained.

The operation of combining pieces of information stored in storage cells may be performed not immediately after the pieces of information are stored into these storage cells but after a piece of information from the photoelectric converter is stored into another storage cell.

Figure 6:
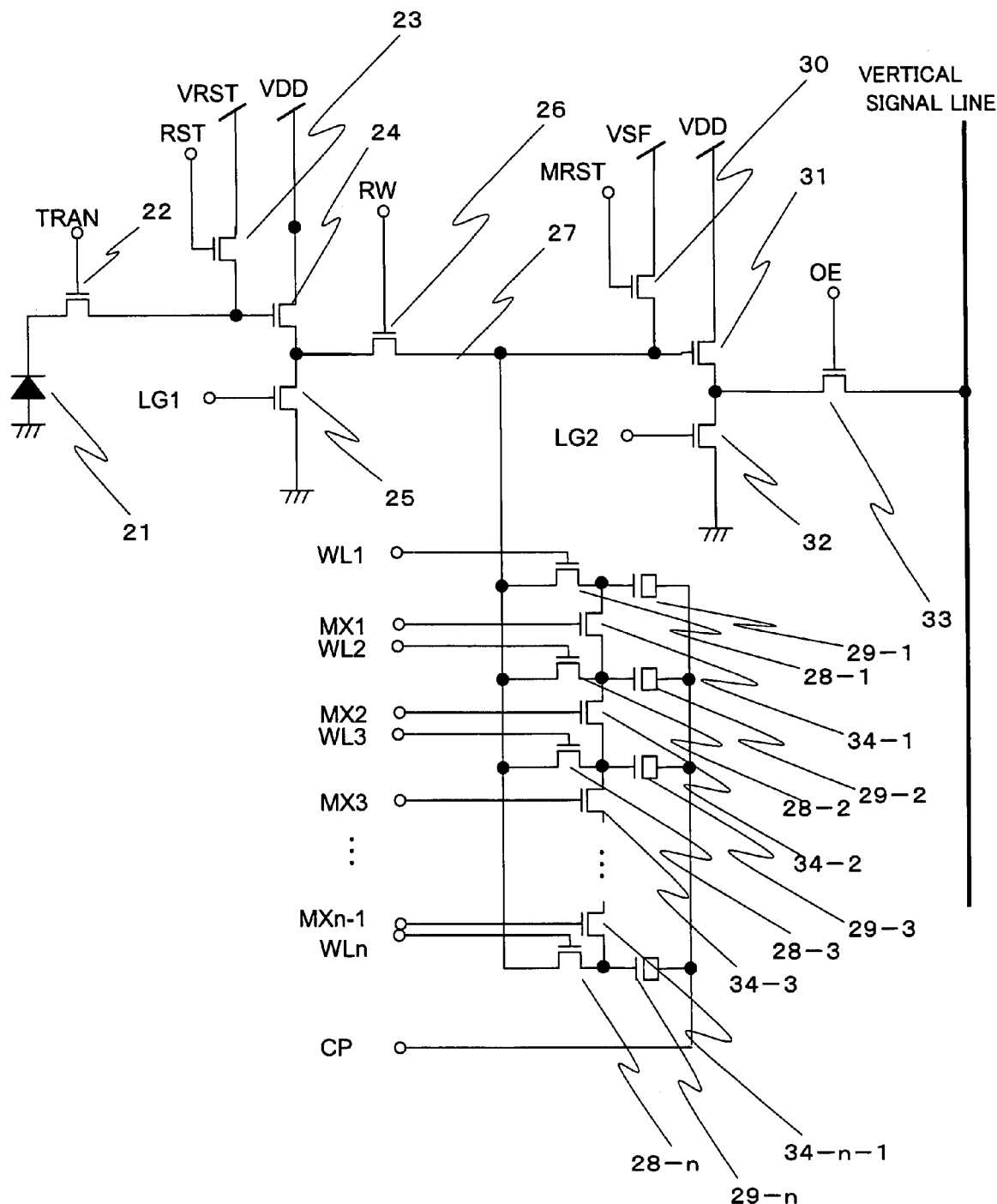
FIG. 6 shows an example of a circuit of the solid-state imaging device according to the embodiment of the present invention.

FIG. 6 shows an example of a circuit that stores a piece of information from a photoelectric converter into a storage cell and combines pieces of information stored in storage cells, with the provision of a circuit capable of performing an operation of combining pieces of information stored in storage cells separately from an operation of storing a piece of information from a photoelectric converter into a storage cell.

In FIG. 6, reference numeral 21 denotes a photoelectric converter, reference numeral 22 denotes a transfer MOS transistor for transferring a piece of information from the photoelectric converter 21, and reference numeral 23 denotes a reset MOS transistor for outputting a pixel noise signal.

A gate of the transfer MOS transistor 22 is connected to signal line TRAN, and a gate of the reset MOS transistor 23 is connected to signal line RST.

A source of the reset MOS transistor 23 is connected to a drain of the transfer MOS transistor 22, and a drain of the reset MOS transistor 23 is set to desired voltage VRST.

An output of the photoelectric converter 21 is connected to a source of the transfer MOS transistor 22, and the drain of the transfer MOS transistor 22 is connected to a gate of a MOS transistor 24.

The MOS transistor 24 and a MOS transistor 25 form a source follower. A drain of the MOS transistor 24 is connected to power supply VDD, and a source of the MOS transistor 24 is connected to a drain of the MOS transistor 25.

Bias voltage LG1 is applied to a gate of the MOS transistor 25.

A connecting point between the source of the MOS transistor 24 and the drain of the MOS transistor 25 is an output node, which is connected to a source of a MOS transistor 26. A gate of the MOS transistor 26 is connected to signal line RW, and a drain of the MOS transistor 26 is connected to a shared signal line 27. The shared signal line 27 is connected to sources of storage cell selection MOS transistors 28-1, 28-2, . . . , 28-n.

Gates of the storage cell selection MOS transistors 28-1, 28-2, . . . , 28-n are respectively connected to signal lines WL1, WL2, . . . , WLn. Drains of the storage cell selection MOS transistors 28-1, 28-2, . . . , 28-n are respectively connected to storage cells 29-1, 29-2, . . . , 29-n, with other terminals of the storage cells 29-1, 29-2, . . . , 29-n being connected to signal line CP.

The shared signal line 27 is connected to a source of an initializing MOS transistor 30 for initializing the shared signal line 27. A drain of the initializing MOS transistor 30 is set to desired voltage VSF, and a gate of the initializing MOS transistor 30 is connected to signal line MRST.

The shared signal line 27 is also connected to a gate of a MOS transistor 31. The MOS transistor 31 and a MOS transistor 32 form a source follower.

A drain of the MOS transistor 31 is connected to power supply VDD, and a source of the MOS transistor 31 is connected to a drain of the MOS transistor 32. Bias voltage LG2 is applied to a gate of the MOS transistor 32. A connecting point between the source of the MOS transistor 31 and the drain of the MOS transistor 32 is an output node, which is connected to a source of an output selection MOS transistor 33.

A gate of the output selection MOS transistor 33 is connected to signal line OE, and a drain of the output selection MOS transistor 33 is connected to a vertical signal line.

Reference numerals 34-1, 34-2, . . . , 34-n−1 denote MOS transistors. A drain and a source of the MOS transistor 34-1 are connected respectively to the storage cells 29-1 and 29-2, a drain and a source of the MOS transistor 34-2 are connected respectively to the storage cells 29-2 and 29-3, and a drain and a source of the MOS transistor 34-n−1 are connected respectively to the storage cells 29-n−1 and 29-n. These MOS transistors 34-1, 34-2, . . . , 34-n−1 each serve as a switch for combining stored pieces of information.

Gates of the MOS transistors 34-1, 34-2, . . . , 34-n−1 are connected respectively to signal lines MX1, MX2, . . . , MXn−1.

Figure 7:
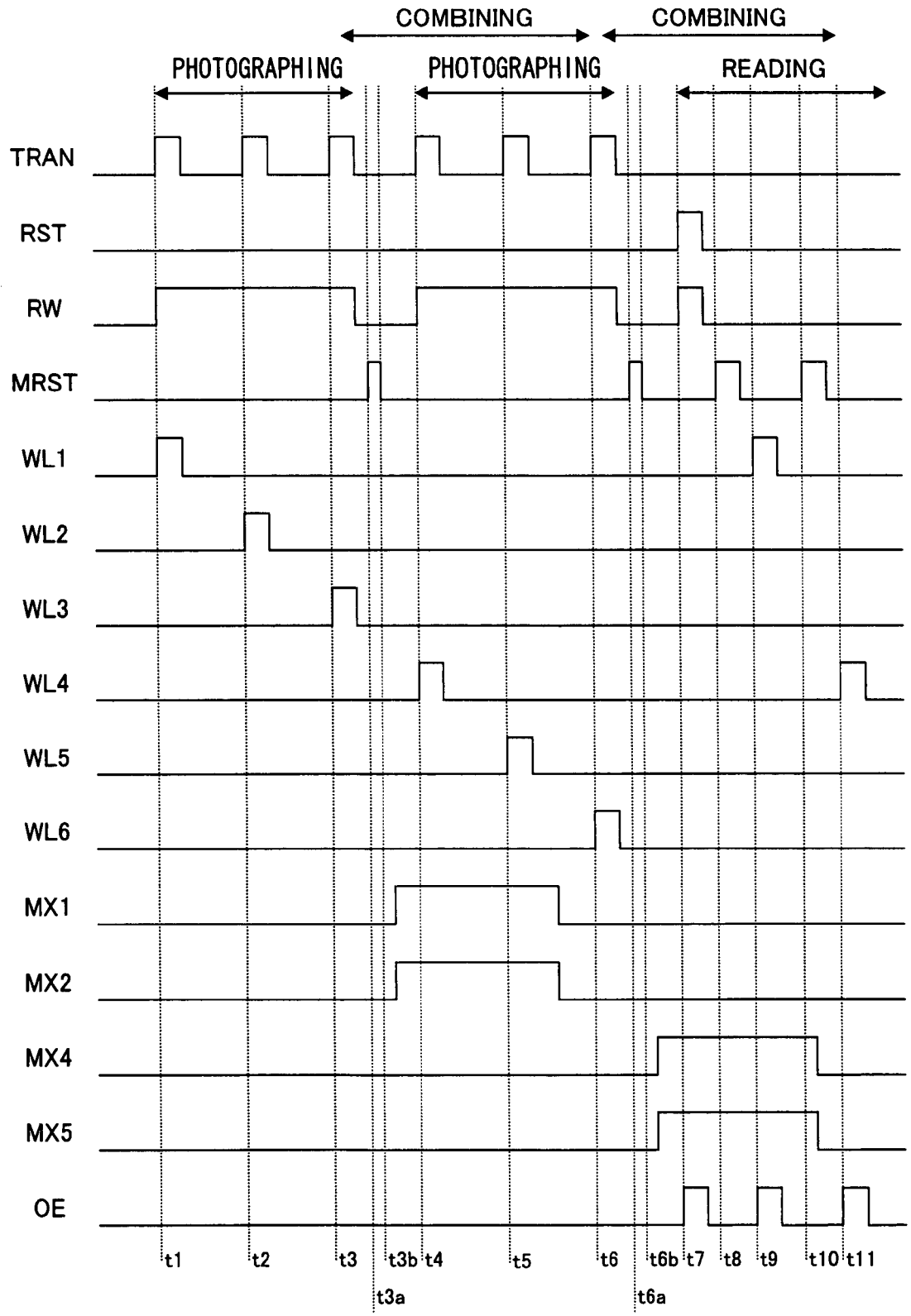
FIG. 7 shows driving pulses of the solid-state imaging device according to the embodiment of the present invention.

FIG. 7 shows an example of driving pulse waveforms of this circuit.

In FIG. 7, TRAN denotes a driving waveform of the signal line connected to the gate of the transfer MOS transistor 22 in FIG. 6. RST denotes a driving waveform of the signal line connected to the gate of the reset MOS transistor 23 in FIG. 6. RW denotes a driving waveform of the signal line connected to the gate of the MOS transistor 26 in FIG. 6. MRST denotes a driving waveform of the signal line connected to the gate of the initializing MOS transistor 30 in FIG. 6.

WL1 to WL8 denote driving waveforms of the signal lines connected to the gates of the storage cell selection MOS transistors 28-1 to 28-n in FIG. 6. MX1 to MX5 denote driving waveforms of the signal lines connected to the gates of the information combining MOS transistors 34-1 to 34-n−1 in FIG. 6.

At time t1, a HIGH pulse is applied to signal line RW and signal line TRAN, and the storage cell selection MOS transistor 28-1 corresponding to the first storage cell 29-1 is turned on, to transfer a piece of information from the photoelectric converter 21 to the first storage cell 29-1.

Likewise, at time t2, a piece of information from the photoelectric converter 21 is transferred to the second storage cell 29-2.

At time t3, a piece of information from the photoelectric converter 21 is transferred to the third storage cell 29-3.

Next, at time t3a, a HIGH pulse is applied to signal line MRST, to initialize the shared signal line 27 that connects the photoelectric converter 21 and the storage cells.

At time t3b that follows, the switch 34-1 for combining the pieces of information stored in the first storage cell 29-1 and the second storage cell 29-2 and the switch 34-2 for combining the pieces of information stored in the second storage cell 29-2 and the third storage cell 29-3 are turned on, to combine the pieces of information stored in the first storage cell 29-1, the second storage cell 29-2, and the third storage cell 29-3. As a result, a combined signal is stored in the first storage cell 29-1, the second storage cell 29-2, and the third storage cell 29-3.

While the combining operation is being performed from about t3b to t6 in the above way, pieces of information are stored into the remaining storage cells from t4 to t6. In so doing, a waste of time caused by stopping a photographing operation until the combining operation is completed can be avoided.

After the operation of storing into the fourth to sixth storage cells and the operation of combining the pieces of information stored in the fourth to sixth storage cells are completed in the same way as above, at time t7, a HIGH pulse is applied to signal line RST, signal line RW, and signal line OE, to output a pixel noise signal. At time t8, a HIGH pulse is applied to signal line MRST. At time t9, signal line OE is driven HIGH, and the storage cell selection MOS transistor 28-1 corresponding to the first storage cell 29-1 is turned on. As a result, the combined information stored in the first storage cell 29-1 is output.

Following this, at time t10, a HIGH pulse is applied to signal line MRST. At time t11, signal line OE is driven HIGH, and the storage cell selection MOS transistor 28-4 corresponding to the fourth storage cell 29-4 is turned on. As a result, the combined information stored in the fourth storage cell 29-4 is output.

Here, noise specific to the pixel can be removed by taking a difference between the pixel noise signal previously output at time t7 and each of the signals output at times t9 and t11.

Thus, the operation of storing a piece of information from the photoelectric converter to a storage cell and the operation of combining pieces of information stored in storage cells may be performed in parallel.

FIG. 8 shows a change in information stored in each storage cell, when combining pieces of information stored in storage cells. In FIG. 8, V1 denotes a piece of information from the photoelectric converter at time t1.

FIG. 8 shows an example of using eight storage cells and combining pieces of information stored in four storage cells. FIG. 8A shows a state where four pieces of information from time t1 to time t4 are stored respectively in the first to fourth storage cells. By combining these four pieces of information, the combined information is stored in the first to fourth storage cells as shown in FIG. 8B.

Next, four pieces of information from time t5 to time t8 are stored respectively in the second to fifth storage cells, as shown in FIG. 8C.

After repeating the above operation of combining four pieces of information three times, four pieces of information from time t17 to time t20 are stored respectively in the fifth to eighth storage cells, as shown in FIG. 8D.

Lastly, the four pieces of information stored in the fifth to eighth storage cells are combined, which results in a state shown in FIG. 8E.

After this, by reading the information stored in each of the first to fifth storage cells, it is possible to read the pieces of information corresponding to time t1 to time t20.

When m storage cells are used and K pieces of information are combined, it is possible to store pieces of information corresponding to $K \times \{m-(K-1)\}$ time points.

Second Embodiment

Pieces of information corresponding to more time points can be stored by, after combining pieces of information stored in storage cells, further combining the combined information with other combined information.

FIG. 9 shows an example of using eight storage cells and combining three pieces of information. When the combining operation is performed according to the aforedescribed method, pieces of information from time t1 to time t18 can be stored as shown in FIG. 9A. In a state where a piece of combined information corresponding to time t1 to time t3, a piece of combined information corresponding to time t4 to time t6, and a piece of combined information corresponding to time t7 to time t9 are stored respectively in the first to third storage cells, by combining these pieces of combined information stored in the first to third storage cells, combined information of the pieces of information from time t1 to time t9 can be obtained. By repeating this operation, pieces of information from time t1 to time t36 can be stored as shown in FIG. 9B. By further repeating this combining operation, pieces of information from time t1 to time t54 can be stored as shown in FIG. 9C.

Thus, by repeatedly combining information stored in a plurality of storage cells, it is possible to store pieces of information corresponding to a significantly larger number of time points.

When m storage cells are used and an operation of combining K pieces of information is performed n times, it is possible to store information corresponding to $n \times K \times \{m - n \times (K-1)\}$ time points, where $n \geq m \div K + 1$.

Here, when repeatedly performing an operation of combining pieces of information stored in storage cells, the combined information may be stored in a storage cell other than the storage cells.

Third Embodiment

Figure 10A:
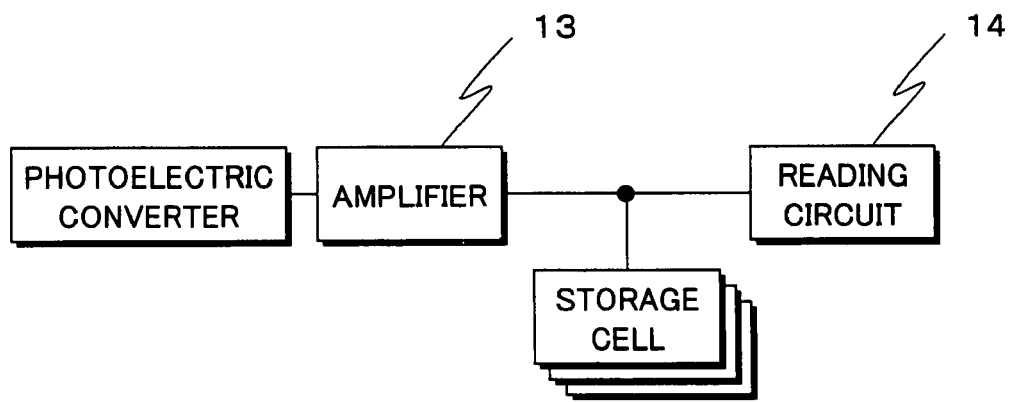
FIG. 10 shows an example construction of the solid-state imaging device according to another embodiment of the present invention.
Figure 10B:
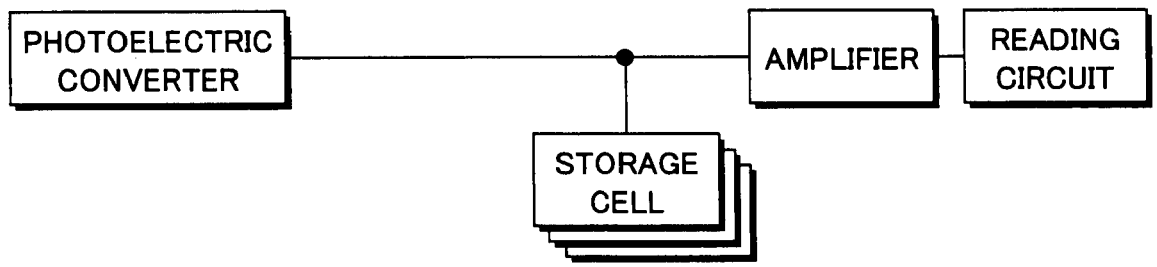
Figure 10C:
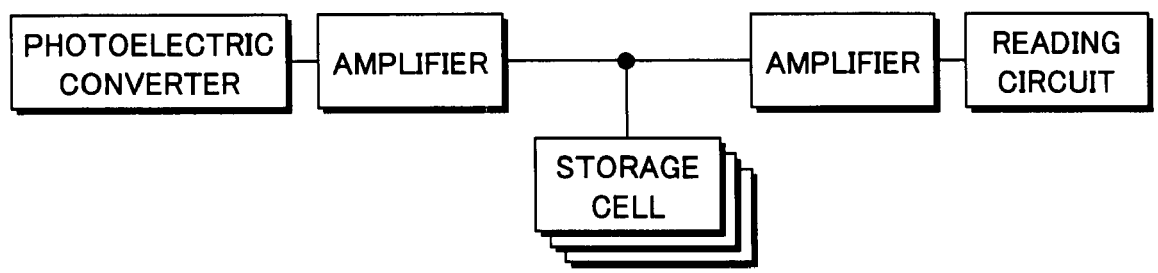

FIG. 10 is a block diagram where an amplifier for amplifying information from a photoelectric converter is provided in a pixel.

In FIG. 10, reference numeral 13 denotes an amplifier for amplifying information from a photoelectric converter, and reference numeral 14 denotes a reading circuit for reading information stored in a storage cell group. The amplifier may be provided between the photoelectric converter and the storage cell group as shown in FIG. 10A, provided between the storage cell group and the reading circuit as shown in FIG. 10B, or provided both between the photoelectric converter and the storage cell group and between the storage cell group and the reading circuit.

Figure 11:
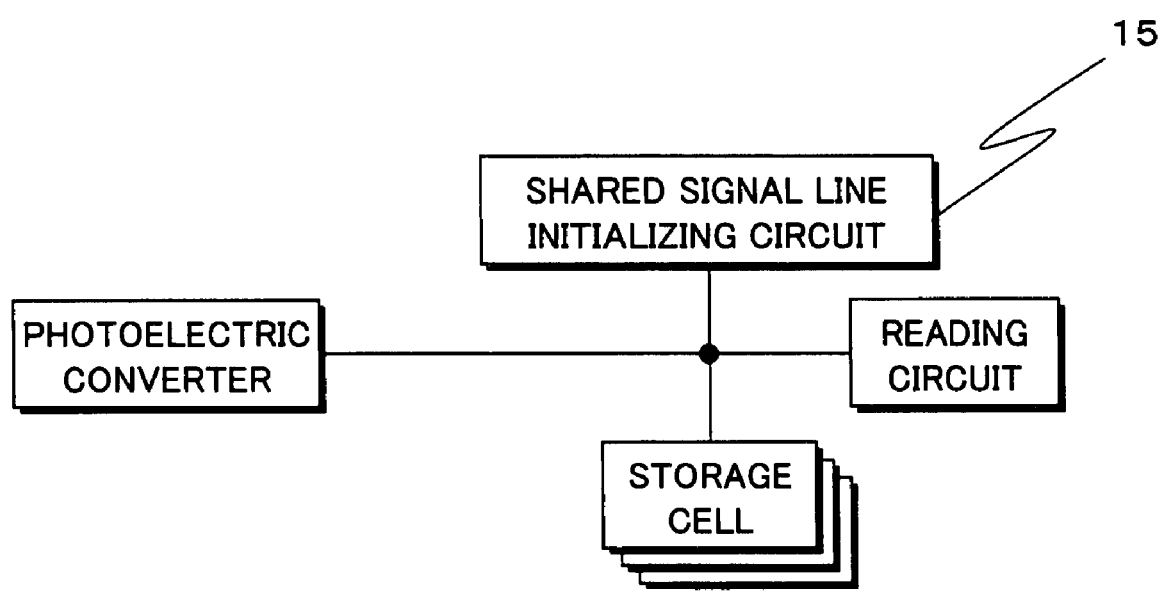
FIG. 11 shows an example construction of the solid-state imaging device according to another embodiment of the present invention.

FIG. 11 is a block diagram where a circuit having an initializing means for partly or entirely initializing a shared signal line that connects a photoelectric converter and a storage cell group is provided in a pixel. In FIG. 11, reference numeral 15 denotes an initializing circuit for partly or entirely initializing a shared signal line.

Figure 12A:
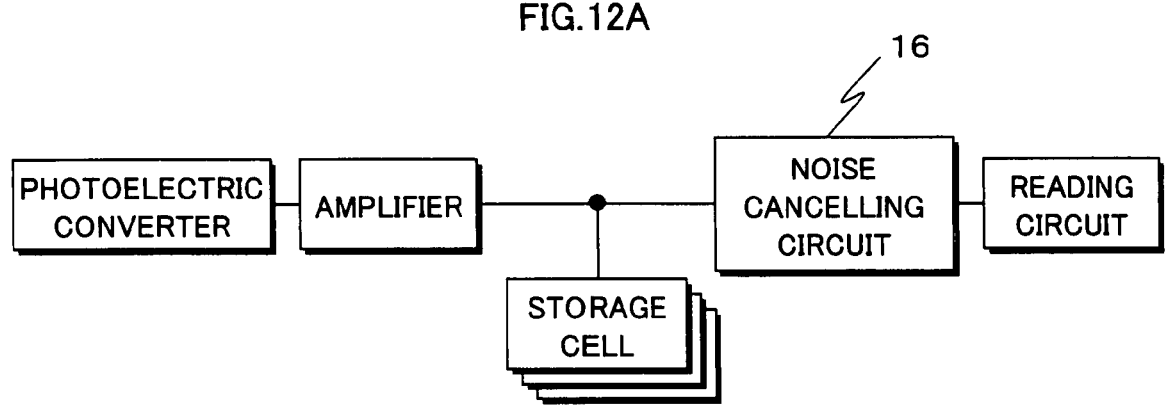
FIG. 12 shows an example construction of the solid-state imaging device according to another embodiment of the present invention.
Figure 12B:
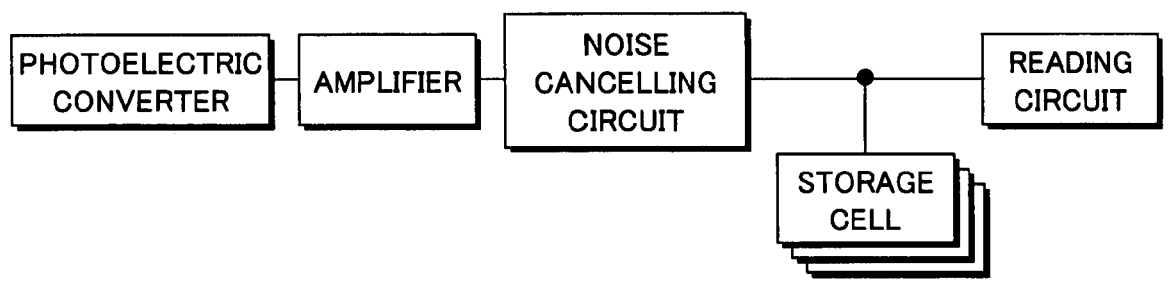

FIG. 12 shows an example of including a noise cancelling circuit for removing fixed pattern noise caused by a variation in pixel property. In FIG. 12, reference numeral 16 denotes a noise cancelling circuit. The noise cancelling circuit may be provided between a storage cell group and a reading circuit as shown in FIG. 12A, or provided between a photoelectric converter and the storage cell group as shown in FIG. 12B.

Fourth Embodiment

A reading time can be reduced by, after storing pieces of information output from a photoelectric converter at different time points into storage cells, simultaneously reading pieces of information from the storage cells and combining the pieces of information at the time of reading.

A reading time can be reduced by, after performing at least one operation of combining pieces of information stored in storage cells, simultaneously reading pieces of information from the storage cells and combining the pieces of information at the time of reading.

Thus, pieces of information stored in a plurality of storage cells can be read by one reading operation. This contributes to a shorter reading time. By repeating a process of, after storing more images than the number of storage cells by combining as many images or pieces of information as the storage cells, reading all images by one reading operation and then storing new images, it is possible to store a larger number of images.

Other Modifications

Although the present invention has been described by way of the above embodiments, it should be obvious that the present invention is not limited to the above. For example, the following modifications are possible.

(1) The above embodiments describe the case where image selection is performed by a MOS transistor as an image sensor, but an image sensor according to CCD may instead be used.

(2) The circuit examples shown in FIGS. 4 and 5 are not a limit for the present invention.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A solid-state imaging device comprising:
a photoelectric converter corresponding to a pixel and configured to output a signal charge in accordance with received light;
j storage cells corresponding to the pixel and configured to respectively store therein pieces of information corresponding to signal charges that are output from the photoelectric converter at different time points, where $j \geq 3$;
a combining unit configured to combine pieces of information stored in at least two storage cells of the j storage cells, to generate combined information; and
a selective storing unit configured to store the combined information into one of the j storage cells, wherein:
the photoelectric converter is connected to the j storage cells by one shared signal line,
each of the j storage cells is connected to a corresponding switch circuit in series thereby forming j series circuits,
the j series circuits are connected to the shared signal line in parallel, and
each of the j storage cells is connected to the shared signal line via the corresponding switch circuit,
the at least two storage cells are f storage cells, where $2 \leq f \leq j-1$, and
the storage cell in which the combined information is stored is other than the f storage cells.

2. The solid-state imaging device of claim 1, further comprising:
a signal amplifier configured to amplify a signal charge output from the photoelectric converter before the storing by a storage cell.

3. The solid-state imaging device of claim 1,
wherein
the solid-state imaging device further comprises:
an initializing unit configured to partly or entirely initialize a signal charge of the shared signal line.

4. The solid-state imaging device of claim 1, further comprising:
a noise cancelling circuit configured to remove noise specific to the pixel.

5. The solid-state imaging device of claim 1, wherein the switch circuit includes only one transistor.

6. A solid-state imaging device comprising:
a photoelectric converter corresponding to a pixel and configured to output a signal charge in accordance with received light;
j storage cells corresponding to the pixel and configured to respectively store therein pieces of information corresponding to signal charges that are output from the photoelectric converter at different time points, where $j \geq 2$;
a combining unit configured to combine pieces of information stored in at least two storage cells of the j storage cells, to generate combined information; and
a selective storing unit configured to store the combined information into one of the j storage cells,
wherein $j \geq 3$,
the at least two storage cells are f storage cells, where $2 \leq f \leq j-1$, and
the storage cell in which the combined information is stored is other than the f storage cells.

7. A solid-state imaging device comprising:
a photoelectric converter corresponding to a pixel and configured to output a signal charge in accordance with received light;
j storage cells corresponding to the pixel and configured to respectively store therein pieces of information corresponding to signal charges that are output from the photoelectric converter at different time points, where $j \geq 2$;
a combining unit configured to combine pieces of information stored in at least two storage cells of the j storage cells, to generate combined information;
a selective storing unit configured to store the combined information into one of the j storage cells; and
a writing unit configured to, in parallel with the combining by the combining unit, write a piece of information corresponding to a signal charge output from the photoelectric converter, into a storage cell other than the at least two storage cells, wherein:
the photoelectric converter is connected to the j storage cells by one shared signal line,
each of the j storage cells is connected to a corresponding switch circuit in series thereby forming j series circuits,
the j series circuits are connected to the shared signal line in parallel, and
each of the j storage cells is connected to the shared signal line via the corresponding switch circuit.

8. A solid-state imaging device comprising:
a photoelectric converter corresponding to a pixel and configured to output a signal charge in accordance with received light;
j storage cells corresponding to the pixel and configured to respectively store therein pieces of information corresponding to signal charges that are output from the photoelectric converter at different time points, where $j \geq 2$;
a combining unit configured to combine pieces of information stored in at least two storage cells of the j storage cells, to generate combined information;
a selective storing unit configured to store the combined information into one of the j storage cells; and
a noise cancelling circuit configured to remove noise specific to the pixel, wherein:
the photoelectric converter is connected to the j storage cells by one shared signal line,
each of the j storage cells is connected to a corresponding switch circuit in series thereby forming j series circuits,
the j series circuits are connected to the shared signal line in parallel,
each of the j storage cells is connected to the shared signal line via the corresponding switch circuit, and
the noise cancelling circuit removes the noise before the storing by a storage cell.

9. A driving method for a solid-state imaging device that includes: a photoelectric converter corresponding to a pixel and configured to output a signal charge in accordance with received light; and n storage cells corresponding to the pixel and configured to respectively store pieces of information corresponding to signal charges output from the photoelectric converter, the driving method comprising:
a first storing step of storing pieces of information corresponding to signal charges that are output from the photoelectric converter at different time points $t(1), t(2), \ldots, t(n)$, respectively into the n storage cells;
a combining step of combining pieces of information stored in at least two storage cells of the n storage cells to generate combined information, and storing the combined information into one storage cell; and
a second storing step of storing a piece of information corresponding to a signal charge that is output from the photoelectric converter at a time point $t(n+1)$, into a storage cell other than the storage cell in which the combined information is stored.

10. The driving method of claim 9, wherein an interval between adjacent time points of t(1), t(2), ..., t(n), t(n+1) is fixed.

11. The driving method of claim 9,
wherein the photoelectric converter outputs a signal charge corresponding to an intensity of light received in each time frame of a same length that includes a different one of the time points t(1), t(2), ..., t(n), t(n+1).

12. The driving method of claim 9,
wherein the second storing step stores pieces of information corresponding to signal charges that are output from the photoelectric converter at time points t(n+1) to t(n+m), respectively into m storage cells other than the storage cell in which the combined information is stored, and
the combining and storing by the combining step end before the storing by the second storing step ends.

13. The driving method of claim 12,
wherein an interval between adjacent time points of t(1), t(2), ..., t(n), t(n+1), ..., t(n+m) is fixed.

14. The driving method of claim 12,
wherein m=n.

15. The driving method of claim 9, further comprising:
a reading step of reading signal charges output from the photoelectric converter at a plurality of time points, by a single operation of reading from the storage cell in which the first combined information or the second combined information is stored.

* * * * *